(12) United States Patent
Hammoud (10) Patent No.: US 8,924,868 B2
(45) Date of Patent: Dec. 30, 2014

(54) MOVING AN ACTIVITY ALONG TERMINALS ASSOCIATED WITH A PHYSICAL QUEUE

(75) Inventor: Amer Hammoud, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/288,621

(22) Filed: Nov. 3, 2011

(65) Prior Publication Data
US 2013/0117695 A1    May 9, 2013

(51) Int. Cl.
| G06F 3/048 | (2013.01) |
| G06Q 30/00 | (2012.01) |
| G06Q 50/10 | (2012.01) |
| G06Q 10/06 | (2012.01) |

(52) U.S. Cl.
CPC ............... *G06Q 10/06* (2013.01); *G06Q 30/00* (2013.01); *G06Q 50/10* (2013.01)
USPC ........................................................ 715/761

(58) Field of Classification Search
CPC ............................... G06F 3/048; G06Q 10/06
USPC ........................................................ 715/761
See application file for complete search history.

(56) References Cited

U.S. PATENT DOCUMENTS

| 6,820,260 | B1 * | 11/2004 | Flockhart et al. ............. 717/173 |
| 7,277,947 | B1 * | 10/2007 | Van De Sluis et al. ........ 709/227 |
| 7,857,704 | B2 | 12/2010 | Henry et al. |
| 7,882,443 | B2 | 2/2011 | Fuhrmann et al. |
| 7,930,204 | B1 | 4/2011 | Sharma et al. |
| 2002/0044103 | A1 | 4/2002 | Paulson |
| 2003/0107649 | A1 | 6/2003 | Flickner et al. |
| 2006/0015503 | A1 * | 1/2006 | Simons et al. .................. 707/10 |
| 2007/0286220 | A1 * | 12/2007 | Stenning ........................ 370/412 |
| 2008/0273687 | A1 * | 11/2008 | Knott et al. .............. 379/266.01 |
| 2009/0203382 | A1 | 8/2009 | Walter |
| 2010/0063854 | A1 * | 3/2010 | Purvis et al. ....................... 705/5 |
| 2010/0105461 | A1 * | 4/2010 | Miller .............................. 463/16 |
| 2011/0199486 | A1 * | 8/2011 | Moriya .......................... 348/150 |
| 2011/0225068 | A1 * | 9/2011 | Figueroa et al. ............. 705/27.1 |
| 2011/0314134 | A1 * | 12/2011 | Foti ................................ 709/219 |
| 2012/0004840 | A1 * | 1/2012 | Lee et al. ....................... 701/200 |

FOREIGN PATENT DOCUMENTS

EP       1324248 A2    7/2003

OTHER PUBLICATIONS

Chris Heger, Waiting as Part of the Fun: Interactive Gaming in Theme Park Queues, Apr. 17, 2009, Proceedings of the fifth Student Interaction Design Research Conference, pp. 49-55.*

(Continued)

*Primary Examiner* — William Bashore
*Assistant Examiner* — Jeanette J Parker
(74) *Attorney, Agent, or Firm* — Shumaker & Sieffert, P.A.

(57) ABSTRACT

Aspects of this disclosure describe techniques for moving an activity down a physical queue. An example technique estimates a wait time to reach a service point for a user at a first position of a physical queue, selects an activity for the user at the first position of the physical queue based on the estimated wait time, the activity including an interactive application, sends the selected activity to a terminal associated with the first position of the physical queue, and, after receiving an indication that the user has advanced to a second position that is closer to the service point than the first position, forwards the activity to a terminal associated with the second position of the physical queue.

22 Claims, 6 Drawing Sheets

(56) References Cited

OTHER PUBLICATIONS

McGuire et al., "A framework for evaluating the customer wait experience," Journal of Service Management, vol. 21, No. 3, pp. 269-290 (2010).

Heger et al., "Waiting as Part of the Fun: Interactive Gaming in Theme Park Queues," Proceedings of the Fifth Student Interaction Design Research Conference, Apr. 15-17, 2009 (pp. 49-52).
Combined Search and Examination Report from corresponding Application Serial No. GB1218533.6 dated Feb. 18, 2013 (7 pages).

* cited by examiner

MOVING AN ACTIVITY ALONG TERMINALS ASSOCIATED WITH A PHYSICAL QUEUE

TECHNICAL FIELD

The disclosure relates to waiting in physical queues

BACKGROUND

Waiting in line can be a trying experience for even the most patient person. While some people may bring reading material or a crossword puzzle to help pass the time while waiting in line, other people without such materials are left to wait for the people ahead of them in line to finish their transactions.

For businesses, long wait times in line can drive away potential customers as well as create unhappy customers. While some businesses will open new checkout lines or service counters when wait times get too long at existing checkout lines or service counters, a business might not always be sufficient staff on hand to open additional checkout lines or service counters. Further, during certain peak business periods (e.g., lunch time or right after work), customers may still experience long wait times even when every single checkout line or service counter at a business is open and staffed.

SUMMARY

In general, aspects of this disclosure describe techniques for alleviating the boredom and other negative feelings experienced by a person waiting in line to receive service at a service point at a business or organization. For example, some aspects of this disclosure describe techniques for presenting an activity, such as an interactive software application, to a person waiting in line, so that the person may be able to occupy their time while waiting in line by interacting with the presented activity.

The activity presented to the person waiting in line may be relevant to the person's transactions at the service point. In one example, if the person's transactions at the service point will require her to fill out a form, the activity may relate to allowing her to fill out that form as she waits in line.

As the person progresses towards the front of the line, the activity can be forwarded down the line along with the person, so that the person can continue interacting with the activity. The activity can follow the person as the person moves from one line to another line, and can also follow the person via the person's mobile phone after the person exits the business or organization entirely. The activity presented to the person can be chosen based on the estimated wait time of the person in line, so that the activity may take about as much time to complete as the person's estimated wait time in line.

In one aspect, the present disclosure is directed to a method in which an activity is moved down a queue. The method includes estimating a wait time to reach a service point for a user at a first position of a physical queue. The method further includes selecting an activity for the user at the first position of the physical queue based on the estimated wait time, the activity including an interactive software application. The method further includes sending the selected activity to a terminal at the first position of the physical queue. The method further includes, after receiving an indication that the user has advanced to a second position that is closer to the service point than the first position, forwarding the activity to a terminal at the second position of the physical queue.

In another aspect, the present disclosure is directed to a computing device. The computing device includes one or more processors. The computing device further includes a wait estimation module executing on the one or more processors and configured to estimate a wait time to reach a service point for a user at a first position of a physical queue. The computing device further includes an activities module executing on the one or more processors and configured to select an activity based on an estimated time of completion for the activity and the estimated wait time, the activity including an interactive software application. The computing device further includes a queue syncing module executing on the one or more processors and configured to send the activity to a terminal at the first position and to forward the activity to a terminal at a second position of the physical queue upon receiving an indication that the physical queue has advanced, the second position being closer to the service point than the first position.

In another aspect, the present disclosure is directed to a computer-readable medium containing instructions. The instructions cause a programmable processor to estimate a wait time to reach a service point for a user at a first position of a physical queue. The instructions further cause the programmable processor to select an activity for the user at the first position of the physical queue based on the estimated wait time, the activity including an interactive software application. The instructions further cause the programmable processor to send the selected activity to a terminal at the first position of the physical queue. The instructions further cause the programmable processor to, after receipt of an indication that the user has advanced to a second position that is closer to the service point than the first position, forward the activity to a terminal at the second position of the physical queue.

The details of one or more aspects of the disclosure are set forth in the accompanying drawings and the description below. Other features, objects, and advantages of the disclosure will be apparent from the description and drawings, and from the claims.

DETAILED DESCRIPTION

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
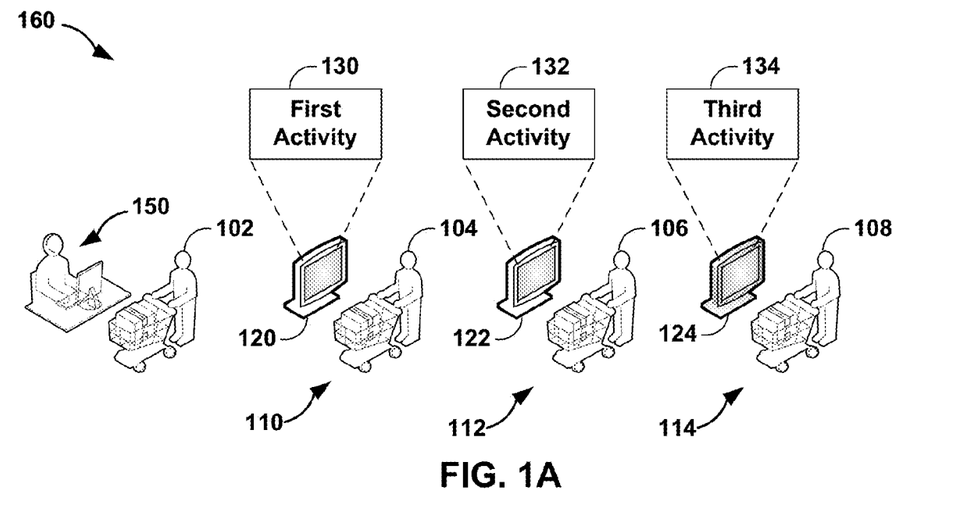
FIGS. 1A and 1B are conceptual diagrams illustrating example techniques for moving an interactive application down a physical queue according to some aspects of the disclosure.
Figure 1B:
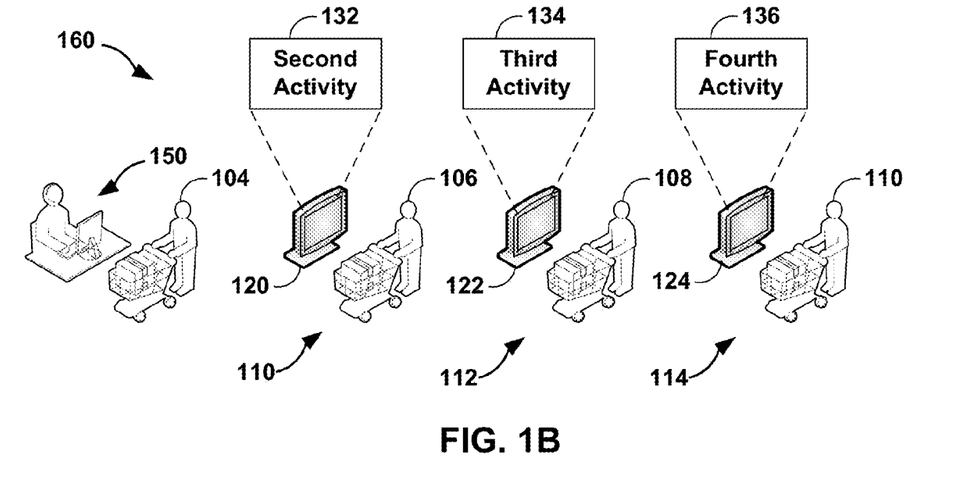

FIGS. 1A and 1B are conceptual diagrams illustrating example techniques for moving an interactive application down a physical queue. As shown in FIG. 1A, in some examples, first user 102 may be at service point 150, while second user 104, third user 106, and fourth user 108 may be in physical queue 160 waiting to advance towards service point 150. In some examples, physical queue 160 may be any place in which people line up or queue for goods or services, including but not limited to a checkout line at a store, a line at a bank, a line at a bus stop, or a line at the Department of Motor Vehicles (DMV). In some non-limiting examples, service point 150 may be a point of sale manned by a sales clerk, a bank counter manned by a bank teller, a theater box office, or a service window at the DMV.

First user 102 may be considered as not being located in physical queue 160 because first user 102 is currently located at service point 150 and thus is considered to have exited physical queue 160. Second user 104 may be considered to be at the head of physical queue 160 because second user 104 is at a position in physical queue 160 that is closest to service point 150, while fourth user 108 may be considered to be at the tail of queue physical 160 because fourth user 108 is the user in physical queue 160 that is farthest from service point 150.

Physical queue 160 may be divided up into one or more successive positions. Second user 102 may be located in first position 110 of physical queue 160. Third user 104 may be located in second position 112 of physical queue 160 behind first position 110. Fourth user 108 may be located in third position 114 of physical queue 160 behind second position 112. Each of the positions 110, 112, and 114 within physical queue 160 may have a terminal associated with the position. For example, first terminal 120 may be associated with first position 110, second terminal 122 may be associated with second position 112, and third terminal 124 may be associated with third position 114. In some examples, each of the terminals 120, 122, and 124 may be located at or near their associated positions within physical queue 160. In some examples, first, second, and third terminals 120, 122, and 124 may be computing devices, such as but not limited to a kiosk computer, a desktop computer, a notebook computer, or a tablet computer. In some examples, the terminals may be any electronic or electromechanical hardware device that is used for entering data into, and displaying data from, a computer or a computing system. In some examples, the terminals may include a user interface, such as but not limited to a display, a keyboard, a mouse, one or more buttons, or a touch-sensitive display, that users may interact with to provide input and to receive output from the terminals.

The terminals 120, 122, and 124 may each display an activity, such as an interactive software application, that may be personalized for the respective users 104, 106, and 108 waiting at each associated position in physical queue 160. For example, first terminal 120 may present first activity 130 to second user 104 situated at first position 110 of physical queue 160. Second terminal 122 may present second activity 132 to third user 106 situated at second position 112. Third terminal 124 may present third activity 134 to fourth user 108 situated at third position 114. In some examples, the activities may be presented to the users as interactive applications. In some examples, the activities may be presented by web pages received from a remote server which the terminals may access via a web browser application executing on the terminals. In some examples, the activities may be interactive applications that reside and are executed on the terminals.

In some examples, the activities may relate to the transaction the user wishes to perform at service point 150. In one example, if service point 150 is a DMV service counter, and second user 104 wishes to renew his driver's license once he reaches service point 150, first activity 130 presented to second user 104 at first terminal 120 may be an interactive software application related to driver's license renewal, such as a written road test that the user may attempt to complete by interacting with the first terminal 120, as second user 104 waits in physical queue 160. In another example, if service point 150 is a bank counter, and second user 104 wishes to deposit money into his bank account at service point 150, the first activity 130 presented to second user 104 at first terminal 120 may include an interactive software application for filling out the user's deposit slip. In another example, if service point 150 is a reception desk at a hospital, the first activity 130 presented to second user 104 at first terminal 120 may include an interactive software application for filling out the user's health insurance information and health history forms.

In some examples, the activities presented to a user at a terminal may include interactive computer games. The interactive computer games may be single player games or multi-player games that may be played at the terminal associated with the user's position. In some examples, users may play the interactive computer game with other users in the same physical queue, or with other users in other physical queues, via one or more networks connecting the terminals. For example, the users may play the interactive computer game cooperatively in order to solve a puzzle. Alternatively, the users may play the interactive computer game competitively against one another. In some examples, users may win discounts, reward points, or other prizes by playing the provided interactive computer game. In some examples, a summary of the user's activity while playing the interactive computer game may be generated, and that data may be passed on to service point 150, or may otherwise be stored on servers or other systems.

In some examples, the wait time for a user at physical queue 160 waiting to reach service point 150 may be estimated. Estimating the wait time for the user may include estimating the transaction time for each person waiting in physical queue 160 in front of the user. In the context of a checkout line at a store, a user's transaction time, or the time it takes the person to finish performing a transaction at service point 150, may be estimated based on estimating the amount of items the user has in his shopping cart. Once a transaction time has been estimated for each user in front of the user, an estimated wait time may be calculated for the user by adding up the estimated transaction times for all of the users in front of the user in physical queue 160.

In one example, one or more cameras may be positioned at physical queue 160 and/or at each position of physical queue 160. Pictures may be taken of the user's shopping cart, and the number of items in the user's shopping cart may be estimated. The estimated number of items in the user's shopping cart may be multiplied by a length of time, such as a historical average of transaction times per item, and the estimated transaction time for the user may be calculated.

Alternatively, in another example, each item in the user's shopping cart may be individually tracked. For example, each item in a store may be tagged by a proximity tag, such as a near field communications (NFC) tag. Proximity sensors at physical queue 160 or placed on each shopping cart, may read each item's proximity tag to count the number of items in the user's shopping cart.

Similarly, in some examples, the techniques for estimating the wait time for a user to reach service point 150 may also be used to estimate the wait time for the tail position of physical queue 160. In some examples, the estimated wait time may be used to inform users as to which physical queue currently has the shortest estimated wait time.

The wait time estimates may also be customized for each user at a business or organization. For example, global positioning system (GPS) coordinates of a mobile device associated with a user may be detected. and the location of the user may be determined based on the detected GPS coordinates. The physical distance from the user's location, to each physical queue within the business or organization may also be determined, and an estimated travel time from the user's location to each physical queue may be calculated. A shortest total travel and wait time for the user may be determined based on the shortest combined travel time to a physical queue and the estimated wait time for that physical queue.

In some examples, wait time information, such as the shortest total travel and wait time, may be sent to all users at a business or organization, such as by sending a text message to one or more user's mobile devices. In some examples, wait time information may be displayed prominently around the business or organization. In some examples, the estimated wait time for each position in physical queue 160 may be displayed at the terminals associated with each position.

In some examples, the activity selected for a user in physical queue 160 may be based at least in part on the estimated wait time of the user to reach service point 150. In some examples, an activity may be a software application that resides in a database of activities, and the activity selected from the database of activities may be an activity having an estimated time to completion that is closest to the estimated wait time out of the database of activities. In some examples, the activity selected may be an activity having an estimated time to completion that is closest to the estimated wait time but does not exceed the estimated wait time. In some examples an estimated time to completion for an activity may be the estimated time needed to complete the activity, such as the estimated time needed to finish filling out a form presented by an activity.

As shown in FIG. 1B, physical queue 160 has advanced. First user 102 (not shown) has finished his transactions at service point 150 and has left service point 150. Second user 104, who was previously at the head of physical queue 160 at first position 110, has now left physical queue 160 and has advanced to service point 150. Third user 106, who was previously at second position 112 of physical queue 160, has now advanced to the head of physical queue 160 at first position 110. Fourth user 108, who was previously at the tail of physical queue 160 at third position 114, has now advanced to second position 112. Fifth user 110 has now entered physical queue 160 at the tail of queue 160 in third position 114.

As can be seen, activities may be forwarded from one terminal to another so that the activities may follow the user from position to position as the user advances in physical queue 160. For example, second activity 132, which was previously presented by second terminal 122 when third user 106 was located at second position 112, may be forwarded to and be presented by first terminal 120 because third user 106 has advanced from second position 112 to first position 110 of physical queue 160. Similarly, third activity 134, which was previously presented by third terminal 124 when fourth user 180 was located at third position 114, may be forwarded to and be presented by second terminal 122 because fourth user 108 has advanced from third position 114 to second position 112 of physical queue 160. As can be seen, fifth user 110 has join physical queue 160 at the tail end of the physical queue 160 at third position 114, which was vacated by fourth user 108. A fourth activity associated with fifth user 110 may be presented at third terminal 124 associated with third position 114 of physical queue 160.

In some examples, the activities may be interactive software applications presented on web pages. In some examples, the activities may be forwarded from one terminal to another by sending a universal resource locator (URL) of a web page containing an activity to a terminal. For example, to forward second activity 132 from second terminal 122 to first terminal 120, the URL of the web page containing second activity 132 may be sent to first terminal 120, and first terminal 120 may use the URL to retrieve the web page containing second activity 132. Upon retrieving the web page containing second activity 132, first terminal 120 may execute the second activity 132. In some examples, an activities management server (not shown) may send the URL to first terminal 120. In some examples, second terminal 122 may communicate directly with first terminal 120 to forward the URL to first terminal 120.

In some examples, each terminal within physical queue 160 may be associated with a web page. In this case, second activity 132 may be forwarded from second terminal 122 to first terminal 120 by modifying the web page associated with first terminal 120 so that the web page contains or is otherwise associated with second activity 132, so that first terminal 120 may re-access its associated web page to retrieve and execute second activity 132.

In some examples, state information of the activities may be preserved as the activities are forwarded from terminal to terminal, so that the users at their new positions may be able to pick up where they had previously left off in the activity at their previous positions. For example, for second activity 132 that is associated with third user 106 and that is being forwarded from second terminal 122 associated with second position 112 to first terminal 120 associated with first terminal 110, state information for second activity 132 may be preserved at second terminal 122, and the state of second activity 132 may be restored at first terminal 120 based on the preserved state information.

A variety of techniques may be used to determine whether physical queue 160 has advanced, meaning that users within physical queue 160 have advanced towards service point 150, or have otherwise moved, such as any change in the configuration of users within physical queue 160. Movement of physical queue 160 may include forward advancement of users within physical queue 160 towards service point 150, as well as any users not at the head of physical queue 160 leaving physical queue 160. In some examples, when a transaction is completed at service point 150, it may be assumed that the users in physical queue 160 are each going to advance forward one position towards service point 150, with the user at the head of physical queue 160 leaving physical queue 160 and advancing to service point 150. In some examples, service point 150 may automatically signal that physical queue 160 has advanced. In some examples, a service clerk manning service point 150 may manually provide an indication, such as by pressing a button, which the transaction has been completed at service point 150, and that physical queue 160 has advanced towards service point 150. In some examples, users in physical queue 160 may be able to manually provide an indication that physical queue 160 has advanced forward towards service point 150, such as by pressing a button or selecting an option at a terminal associated with their position in physical queue 160, or by placing an NFC-enabled mobile device in range of an NFC reader at a terminal associated with the position they have advanced to. In some examples, users in physical queue 160 may also indicate that a user not at the head of physical queue 160 has left physical queue 160, such as by pressing a button or selecting an option at a terminal associated with their position in physical queue 160.

In some examples, movement of physical queue 160 may be detected without intervention from service point 150 or the users. In some examples, one or more cameras at physical queue 160 may capture images of physical queue 160, and movement of physical queue 160 may be detected based on the captured images. In some examples, a motion sensor may be placed at physical queue 160 to detect movement of physical queue 160. In some examples, weight sensors may be placed at physical queue 160 to detect movement of physical queue 160. In some examples, in the context of a checkout line, trackers may be placed on shopping carts or baskets to automatically track movement of the shopping carts or baskets.

Figure 2A:
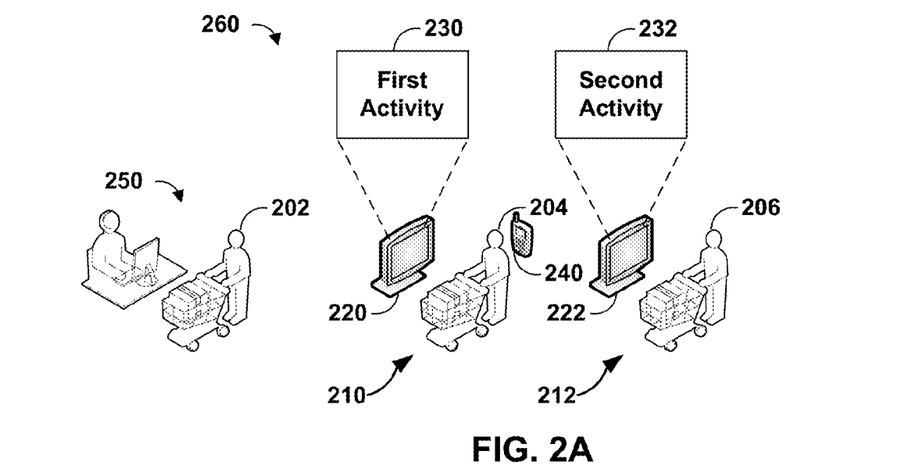
FIGS. 2A-2C are conceptual diagrams illustrating example techniques for moving an interactive application down a physical queue and tracking a user through multiple physical queues according to some aspects of the disclosure.
Figure 2B:
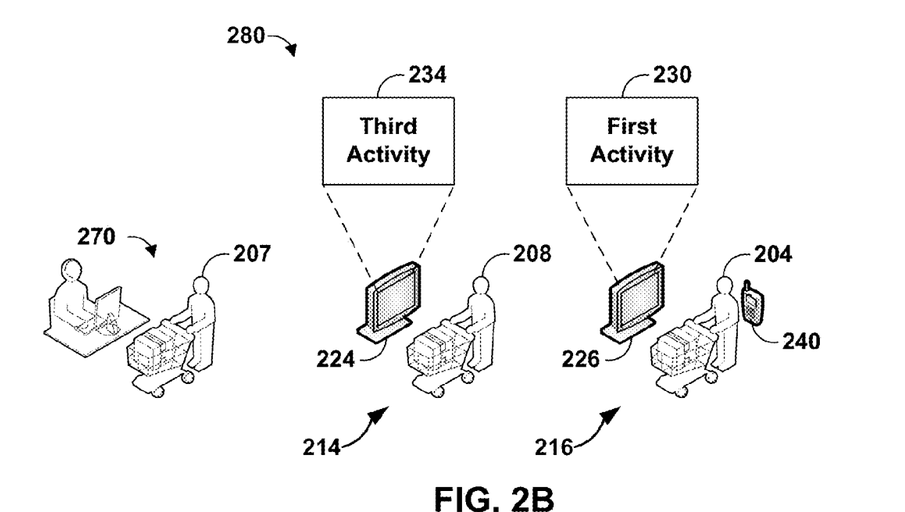
Figure 2C:
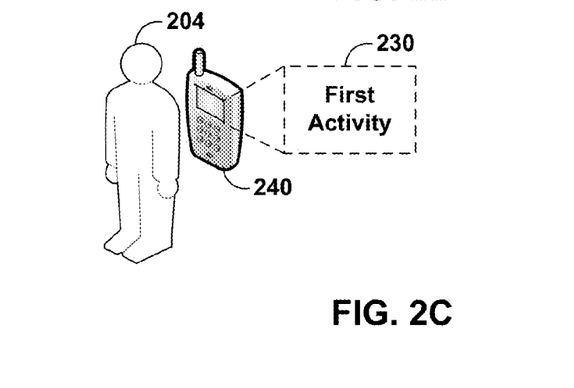

FIGS. 2A-2C are conceptual diagrams illustrating example techniques for moving an interactive application down a physical queue and tracking a user as the user moves amongst multiple physical queues. As shown in FIG. 2A, first physical queue 260 may be a queuing area for first service point 250. First physical queue 260 may include first position 210 and second position 212. First terminal 220 may be associated with first position 210, and second terminal 222 may be associated with second position 212.

First user 202 may be located at first service point 250. Second user 204 may be located at first position 210 of first physical queue 260 and may interact with first activity 230 via first terminal 220 associated with first position 210. Third user 206 may be located at second position 212, and may interact with second activity 232 via second terminal 222 associated with second position 212. In some examples, second user 204 may carry and/or otherwise be associated with a mobile device 240, such as but not limited to a mobile phone, a tablet computer, a personal digital assistant, and the like.

As shown in FIG. 2B, second user 204 has left first physical queue 260 of FIG. 2A and has now entered second physical queue 280 at fourth position 216 of second physical queue 280. Second physical queue 280 may be a queuing area for second service point 270, and second physical queue 280 may include third position 214 and fourth position 216. Fourth user 207 may be at second service point 270, and fifth user 208 may be at third position 214 of second physical queue 280.

Third activity 234 may be presented at third terminal 224 so that fifth user 208 may be able to interact with third activity 234 at third terminal 224. First activity 230, which second user 204 was previously interacting with in first physical queue 260 of FIG. 1, may follow second user 204 from first physical queue 260 of FIG. 1 to second physical queue 280, and may be presented at fourth terminal 226 associated with fourth position 216 of second physical queue 280, so that second user 204 may continue to interact with first activity 230. In some examples, state information of first activity 230 at first terminal 220 of first physical queue 260 may be preserved, and the state of first activity 230 may be restored at fourth terminal 226 of second physical queue 280 based on the preserved state information. In this way, second user 204 may continue to interact with first activity 230 even as second user 204 moves amongst different physical queues, and user 204 may be able to pick up first activity 230 where he last left off.

In some examples, mobile device 240 associated with second user 204 may be tracked to locate second user 204. For example, mobile device 240 may be an NFC-enabled mobile phone, and NFC sensors at first physical queue 260 and second physical queue 280 may be able to sense mobile device 240 if second user 204 enters first physical queue 260 or second physical queue 280. In some examples, a shopping cart or basket of second user 204 may have an embedded tracker or embedded NFC tag that may be used to locate second user 204.

As shown in FIG. 2C, second user 204 has left second physical queue 280, and is now no longer in any physical queues. After second user 204 is no longer in either first physical queue 260 or second physical queue 280, second user 204 may still be able to interact with first activity 230 through his mobile device 240. For example, mobile device 240 may be able to access a server, such as a web server, where first activity 230 can be accessed or downloaded, and mobile device 240 may be able to execute first activity 230. In this way, second user 204 may be able to continue to interact with first activity 230 without being located in a physical queue.

Figure 3:
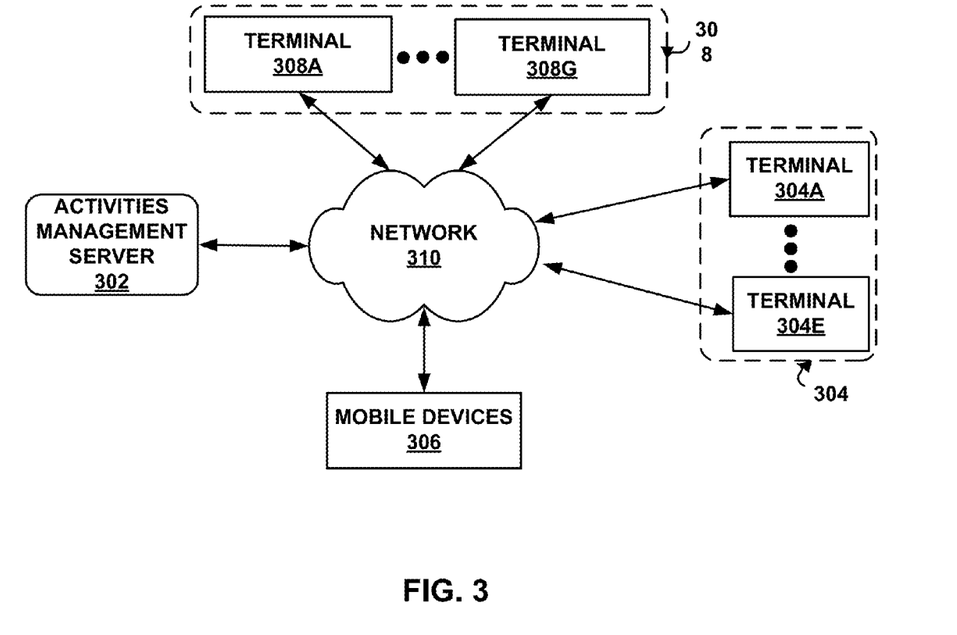
FIG. 3 is a block diagram illustrating an example of an activities management system according to some aspects of the disclosure.

FIG. 3 is a block diagram illustrating an example of an activities management system. As shown in FIG. 3, an activities management system 300 may include an activities management server 302 that may be configured to communicate with one or more terminals within one or more physical queues, such as first terminals 308A to 308G of first physical queue 304, and second terminals 304A to 304E of second physical queue 308, through network 310. The activities management server 302 may also be configured to communicate with one or more mobile devices 306.

In some examples, activities management server 302 may communicate with first and second physical queues 308 and 304 to send activities to first and second terminals 308A-308G and 304A-304E of first and second physical queues 308 and 304, respectively. In some examples, activities management server 320 may host activities, such as interactive software applications, that first and second terminals 308A-308G and 304A-304E may access, such as by downloading and executing the activities. In some examples, activities management server 320 may send activities to first and second terminals 308A-308G and 304A-304E.

In some examples, activities management server 302 may select the activities that the terminals may access and present to users. In some examples, activities management server 302 may host an activities database, and activities may be selected from the activities database. In some examples, activities may be selected for a user based on the intended transaction of the user at a service point. In some examples, each activity in the activities database may be associated with an estimated time to completion, and an activity having an estimated time to completion that is closest to an estimated wait time for a particular user may be selected for that user.

In some examples, activities management server 302 may synchronize activities with terminals in order to forward activities from one terminal to another as users move within or between first and second physical queues 308 and 304. In some examples, activities management server 302 may detect when users within first physical queue 308 or second physical queue 304 has advanced, and accordingly advance the activities on first terminals 308A-308G or second terminals 304A-304E. In some examples activities management server 302 may preserve state information of the activities, so that the states of the activities may be restored based upon the preserved state information.

In some examples, activities management server 302 may communicate with mobile devices 306 to track the locations of mobile devices 306. In this way, activities management server 302 may be able to track the locations of users associated with mobile devices 306. Such tracking of users may be useful to determine if the user has moved from one physical queue to another physical queue, such as from first physical queue 308 to second physical queue 304. In some examples, activities management server 302 may communicate with mobile devices 306 to present activities at mobile devices 306, so that users associated with mobile devices 306 may be able to interact with the presented activities. In some examples, activities management server 302 may communicate with mobile devices 306 to send information regarding the estimated wait times for various physical queues, such as the estimated wait times for first physical queue 308 and second physical queue 304.

Figure 4:
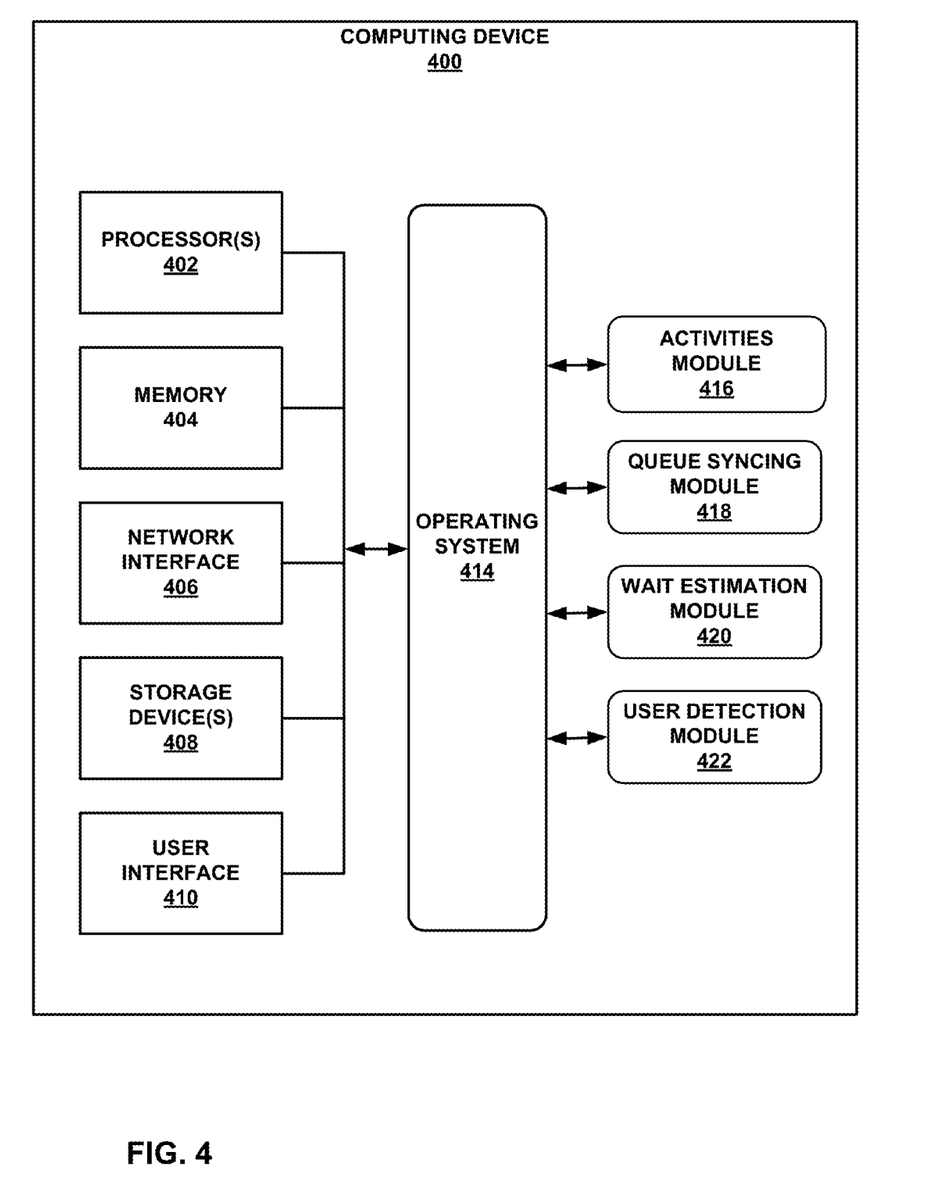
FIG. 4 is a block diagram illustrating components of an example computing device according to some aspects of the disclosure.

FIG. 4 is a block diagram illustrating components of an example computing device making up the activities management server 302 and/or terminals 304, 308 of FIG. 3. FIG. 4 illustrates only one particular example of a computing device, and many other examples of computing devices may be used in other instances.

As shown in FIG. 4, computing device 400 may include one or more processors 402, memory 404, a network interface 406, one or more storage devices 408, and user interface 410. Computing device 402 may also include an operating system 214, which may include modules and/or applications that are executable by processors 402 and computing device 400. Computing device 400, in one example, may also include activities module 416, queue syncing module 418, wait estimation module 420, and user detection module 422, which all may be executable by one or more processors 402 of computing device 402. Each of components 402, 404, 406, 408, 410, 414, 416, 418, 420, and 422 may be interconnected (physically, communicatively, and/or operatively) for inter-component communications.

Processors 402, in one example, may be configured to implement functionality and/or process instructions for execution within computing device 400. For example, processors 402 may be capable of processing instructions stored in memory 404, or instructions stored on storage devices 408. These instructions may define or otherwise control the operation of operating system 414, activities module 416, queue syncing module 418, wait estimation module 420, and user detection module 422.

Memory 404 may, in one example, be configured to store information within computing device 400 during operation. Memory 404, in some examples, may be described as a computer-readable storage medium. In some examples, memory 404 may be a temporary memory, meaning that a primary purpose of memory 404 is not long-term storage. Memory 404 may, in some examples, be described as a volatile memory, meaning that memory 404 does not maintain stored contents when computing device 400 is turned off. Examples of volatile memories may include random access memories (RAM), dynamic random access memories (DRAM), static random access memories (SRAM), and other forms of volatile memories known in the art. In some examples, memory 404 may be used to store program instructions for execution by processors 402. Memory 404 may, in one example, be used by software or applications running on computing device 400 (e.g., activities module 416) to temporarily store information during program execution.

Computing device 400 may, in some examples, also include network interface 406. Computing device 400 may, in one example, use network interface 406 to communicate with external devices, such as mobile devices 306 of FIG. 3, via one or more networks, such as network 310 of FIG. 3. Network interface 406 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, computing device 400 may use network interface 406 to wirelessly communicate with an external device such as a server, mobile phone, or other networked computing device.

Storage devices 408 may, in some examples, also include one or more computer-readable storage media. Storage devices 408 may be configured to store larger amounts of information than memory 404. Storage devices 408 may further be configured for long-term storage of information. In some examples, storage devices 408 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 400 may, in some examples, also include one or more user interfaces 48. User interface 410 may be configured to receive input from a user (e.g., tactile, audio, or video feedback). User interface 410 may include a touch-sensitive and/or a presence-sensitive screen, mouse, a keyboard, a voice responsive system, or any other type of device for detecting a command from a user. In some examples, user interface 410 may include a touch-sensitive screen, mouse, keyboard, microphone, or camera.

User interface 410 may also include, combined or separate from input devices, output devices. In this manner, user interface 410 may be configured to provide output to a user using tactile, audio, or video stimuli. In one example, user interface 410 may include a touch-sensitive screen, sound card, a video graphics adapter card, or any other type of device for converting a signal into an appropriate form understandable to humans or machines. In addition, user interface 410 may include a speaker, a cathode ray tube (CRT) monitor, a liquid crystal display (LCD), or any other type of device that can generate intelligible output to a user.

Computing device 400 may, in some examples, also include operating system 414. Operating system 414 may, in some examples, control the operation of components of computing device 400. For example, operating system 414 may, in one example, facilitate the interaction of activities module 416 with queue syncing module 418, wait estimation module 420, user detection module 422, processors 402, memory 404, network interface 406, storage device 408, and user interface 410.

Computing device 400 may, in some examples, further include activities module 416. Activities module 416 may be an executable software application running on one or more processors 402 and stored in memory 404 or one or more storage devices 408. In some examples, activities module 416 may be configured to select an activity for a user at a position of a physical queue. In some examples, activities may include but is not limited to an interactive software application that may run on one or more processors 402 and presented to a user through user interface 410. In some examples, the activity may be selected from amongst a plurality of activities. In some examples, each activity in the plurality of activities may have an estimated time of completion, and an activity may be selected from amongst the plurality of activities based on an estimated time of completion for the activity and the estimated wait time to reach a service point for the physical queue for the user at that position in the physical queue. In some examples, the activity selected is an activity from amongst the plurality of activities having a time of completion that is closest to the estimated wait time for the user. In some examples, the estimated time of completion for the selected activity is less than the estimated wait time for the user. In some examples, activities module 416 may select an activity that is related to the user's intended transaction at the service point.

Computing device 400 may, in some examples, further include queue syncing module 418. Queue syncing module 418 may be an application running on one or more processors 402 and stored in memory 404 or one or more storage devices 408. In some examples, queue syncing module 418 may be configured to send an activity selected by activity module 416 to a terminal associated with a first position of a physical queue, and, upon receiving an indication that the physical queue has advanced, to forward the activity to a terminal associated with a second position of the physical queue that is closer to the service point than the first position.

In some examples, queue syncing module 418 may also send an activity selected by activity module 416 to a terminal associated with a position of a first physical queue that a user is situated at, and to forward the activity to a terminal associated with a position of a second physical queue, after receiving an indication that the user is now at the position of the second physical queue.

In some examples, queue syncing module 418 may forward an activity from a first terminal to a second terminal by sending an indication that the activity has been terminated to the first terminal, and sending an URL of a web page containing the activity to the second terminal. In some examples, queue syncing module 418 may forward an activity from a first terminal to a second terminal by modifying a web page associated with the second terminal so that the web page contains or is associated with the forwarded activity.

In some examples, queue syncing module 418 may preserve state information of an activity at a terminal associated with a first position, and to restore the state of the activity at a terminal associated with a second position based on the preserved state information. In some examples, queue syncing module 418 may save and retrieve data entered by a user during the course of user interactions with an activity.

Computing device 400 may, in some examples, further include wait estimation module 420. Wait estimation module 420 may be an application running on one or more processors 402 and stored in memory 404 or one or more storage devices 408. In some examples, wait estimation module 420 may be configured to determine an estimated wait time for a user at a certain position in a queue until the user reaches the service point of the queue. In some examples, wait estimation module 420 may be configured to determine an estimated wait time for a user at the tail of a queue until the user reaches the service point of the queue.

In some examples, wait estimation module 420 may determine an estimated wait time of a person at a certain position (e.g., the tail) in a queue by taking a number of factors into consideration. In some examples, those factors may include but is not limited to past performance of the person staffing the service point (e.g., average time spent per transaction), historical trends (e.g., average wait time at 5 PM on weekdays, average wait time for checkout lane 5 on Wednesdays, or average wait times in November the day before Thanksgiving), the number of people currently in line in front of the position in the queue, the total estimated number of items in the carts of people currently in line, the average estimated number of items in the shopping carts of people currently in line in front of the position in the queue, and/or the estimated transaction times for each person in front of the position in the queue.

In some examples, wait estimation module 420 may estimate the transaction time for each person in front of the user in a physical queue, in order to estimate the wait time for that user. In the context of a checkout line at a store, a user's transaction time, or the time it takes the user to finish performing a transaction at a service point, may be estimated based on estimating the amount of items the user has in his shopping cart. Once a transaction time has been estimated for each user in front of the user, an estimated wait time may be calculated for the user by adding up the estimated transaction times.

In some examples, wait estimation module 420 may estimate a transaction time for a user based on the number of items in the user's shopping car or basket. In some examples, wait estimation module may estimate the number of items in the user's shopping cart based on pictures taken of the user's shopping cart. Wait estimation module 420 may multiply the estimated number of items in the user's shopping cart by a length of time, such as a historical average of transaction time per item, to calculate the estimated transaction time for the user.

In some examples, wait estimation module may individually track the items in a user's shopping cart. For example, each item in a store may be tagged by a proximity tag, such as an NFC tag, and may be read by proximity sensors at a physical queue or on a shopping cart to count the number of items in the user's shopping cart.

Computing device 400 may, in some examples, further include user detection module 422. User detection module 422 may be an application running on one or more processors 402 and stored in memory 404 or one or more storage devices 408. In some examples, user detection module 422 may be configured to determine the location of a user within a single physical queue. In some examples, user detection module 422 may be configured to determine the location of a user amongst a plurality of physical queues.

In some examples, user detection module 422 may determine the location of a user within a physical queue based on sensors at positions within the physical queue that senses an NFC-enabled mobile device associated with the user. In some examples, user detection module 422 may determine the location of a user within a physical queue based on the user providing an indication that he is at a certain position within a physical queue, such as by swiping a credit card, by pressing a button, or by selecting an option at a terminal associated with a position within the physical queue.

In some examples, user detection module 422 may determine the location of a user amongst a plurality of physical queues by tracking a mobile device associated with the user. In some examples, sensors at physical queues may be able to sense an NFC-enabled mobile device associated with the user if the user enters a physical queue. Similarly, in some examples, tracking tags may be embedded onto shopping carts and baskets that may be detected by sensors at physical queues as a user enters a physical queue. In some example, the user may provide an indication of his location, such as by swiping a credit card at a terminal within a physical queue.

Any applications (e.g., activities module 416) implemented within or executed by computing device 400 may be implemented or contained within, operable by, executed by, and/or be operatively/communicatively coupled to components of computing device 400 (e.g., processors 402, memory 404, network interface 406, storage devices 408, and user interface 410).

Figure 5:
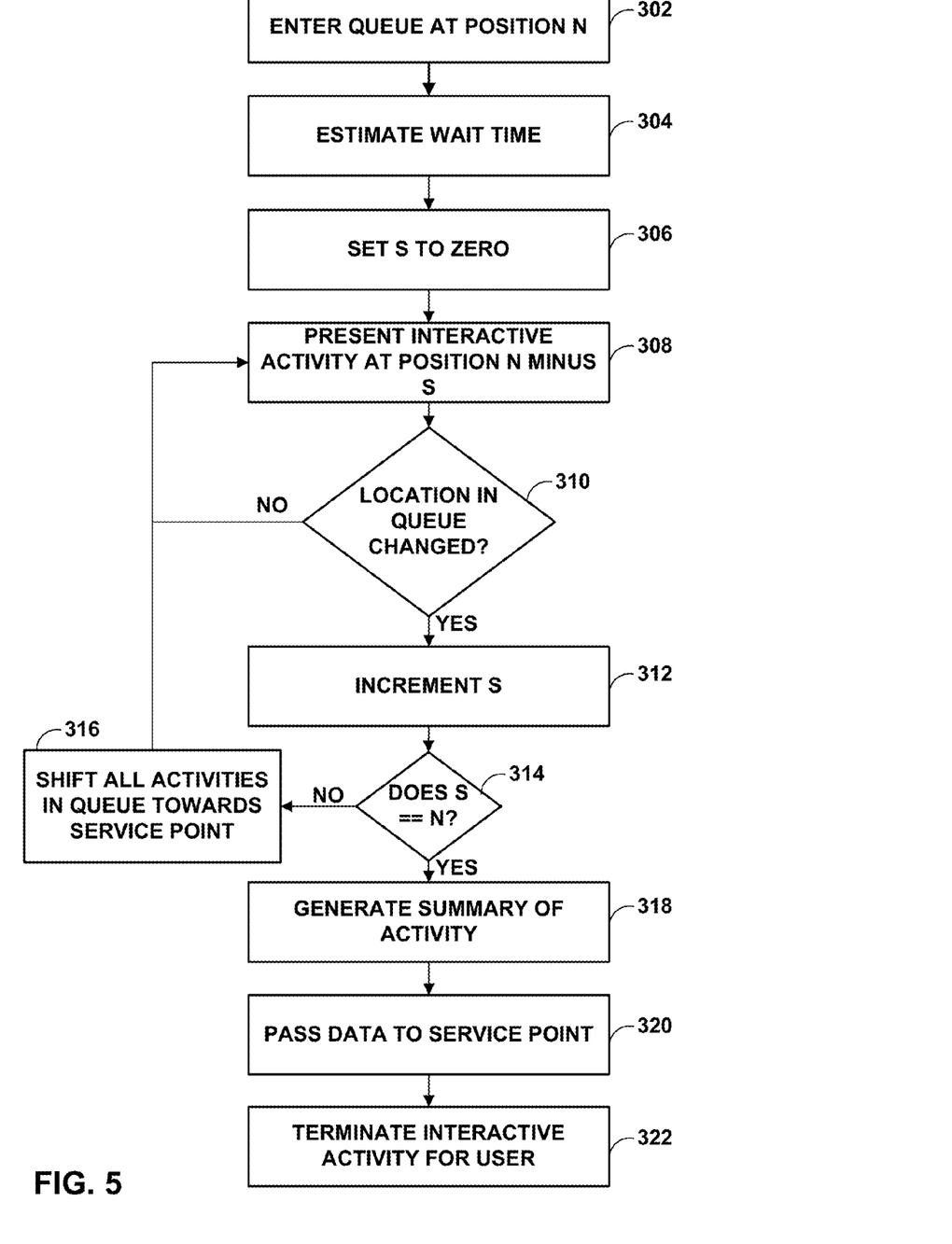
FIG. 5 is a flowchart illustrating an example mode of operation of a system for moving an interactive application down a physical queue according to some aspects of the disclosure.

FIG. 5 is a flowchart illustrating an example mode of operation of a system, such as the activities management system 302 of FIG. 3, for moving an activity down a physical queue. The system may determine that a user has entered a particular queue at position N (302), and may estimate a wait time for that user at location N (304). The system may also set the value of a variable S to zero (306) to help track the position of the user in the queue by subtracting the value of S from the value of position N to determine the position of the user in the queue. The system may present an interactive activity at a terminal at position N minus S within the queue (308). The system may determine whether the user's location in the queue has changed (310) and, if not, continue to present the interactive activity at the terminal at position N minus S (308). If the user's location in the queue has changed, the system may increment variable S (312) and may determine whether the value of S is equal to the value of N (314). If the value of S is not equal to the value of N, meaning that the user is still waiting in the queue, the system may shift all activities in the queue towards the service point (316), and the interactive activity for the user may be presented at a terminal located at new position N minus S (308). Thus, each activity in the queue except the activity closest to the service point may be forwarded one position towards the service point. If the value of S is equal to the value of N, this may mean that the use has reached the service point. Thus, the system may generate a summary of activity for the user (318), may pass that summary to the service point (320), and may terminate the interactive activity for the user (322). In some examples, the system may save data related to the interactive activity for the user, so that the user may be able to resume the interactive activity at a later time.

Figure 6:
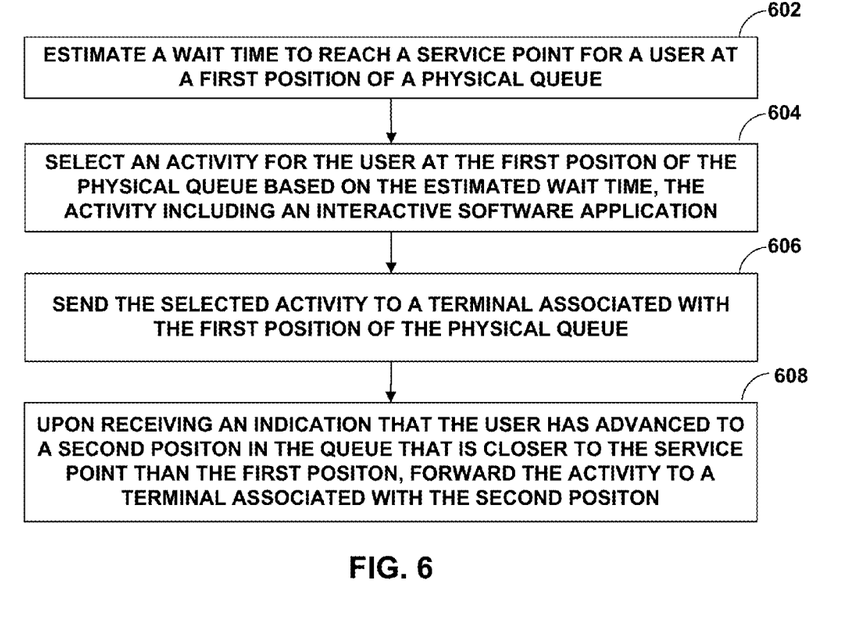
FIG. 6 is a flowchart illustrating an example process for moving an activity down a physical queue according to some aspects of the disclosure.

FIG. 6 is a flowchart illustrating an example process for moving an activity down a physical queue. The process may include estimating a wait time to reach a service point for a user at a first position of a physical queue (602). The process may further include selecting an activity for the user at the first position of the physical queue based on the estimated wait time, the activity including an interactive software application (604). The process may further include sending the selected activity to a terminal at the first position of the physical queue (606). The process may further include, after receipt of an indication that the user has advanced to a second position that is closer to the service point than the first position, forwarding the activity to a terminal at the second position of the physical queue (608).

In some examples, the process may further include, after receiving an indication that the user is now at a position of a second physical queue, forwarding the activity to a terminal associated with the position of the second physical queue.

In some examples, the process may further include tracking a mobile device associated with the user to determine that the user has left the physical queue and is now at the position of the second physical queue.

In some examples, the process may further include forwarding the activity to a mobile device associated with the user after the user leaves the physical queue.

In some examples, selecting the activity may further include selecting the activity having a time to completion that is less than the estimated wait time.

In some examples, selecting the activity may further include selecting the activity that is related to the user's transaction at the service point.

In some examples, forwarding the activity may further include preserving state information of the activity at the terminal associated with the first position, and restoring a state of the activity at the terminal associated with the first position.

In some examples, aspects of the present disclosure may be applicable to users waiting in virtual queues. In some examples, a user waiting on hold on a phone call may be presented with an activity, such as a game, that the user may interact with. If the user is moved from one virtual queue to another virtual queue, such as when the user is transferred to a second number during the course of the phone call, the user may continue to be presented with the activity as the user is on hold waiting at the second number.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Various aspects of the disclosure have been described. These and other aspects are within the scope of the following claims.

The invention claimed is:

1. A method comprising:
   estimating, by at least one processor, a wait time for a user located at a first position of a physical queue to reach a service point, wherein the user queues for the service point in the physical queue;
   selecting, by the at least one processor, an activity for the user at the first position of the physical queue based on the estimated wait time, the activity including an interactive software application;
   sending, by the at least one processor, the selected activity to a first terminal associated with the first position of the physical queue; and
   in response to receiving an indication that the user has advanced to a second position of the physical queue that is closer to the service point than the first position, wherein the second position of the physical queue is different from the service point, forwarding, by at least at least one processor, the selected activity to a second terminal associated with the second position of the physical queue, wherein the first terminal is different from the second terminal.

2. The method of claim 1, further comprising:
   in response to receiving an indication that the user is now at a position of a second physical queue, forwarding the activity to a third terminal associated with the position of the second physical queue.

3. The method of claim 2, further comprising:
   tracking a mobile device associated with the user to determine that the user has left the physical queue and is now at the position of the second physical queue.

4. The method of claim 1, further comprising:
   forwarding the activity to a mobile device associated with the user in response to the user leaving the physical queue.

5. The method of claim 1, wherein selecting the activity further comprises:
   selecting the activity having a time to completion that is less than the estimated wait time.

6. The method of claim 1, wherein selecting the activity further comprises:
   selecting the activity that is related to the user's transaction at the service point.

7. The method of claim 1, wherein forwarding the activity further comprises:
   preserving state information of the activity at the first terminal associated with the first position; and
   restoring a state of the activity at the second terminal associated with the second position based on the preserved state information.

8. The method of claim 1, further comprising:
   estimating a total travel and wait time for a second user not within the physical queue based on an estimated wait time for the physical queue and a physical distance of the second user from the physical queue; and
   sending the total travel and wait time to a mobile device associated with the second user.

9. A computing device comprising:
   one or more processors;
   a wait estimation module executing by the one or more processors and configured to estimate a wait time for a user located at a first position of a physical queue to reach a service point, wherein the user queues for the service point in the physical queue;
   an activities module executing by the one or more processors and configured to select an activity based on an estimated time of completion for the activity and the estimated wait time, the activity including an interactive software application; and
   a queue syncing module executing by the one or more processors and configured to send the activity to a first terminal at the first position and to forward the activity to a second terminal at a second position of the physical queue in response to receiving an indication that the physical queue has advanced, the second position being closer to the service point than the first position, wherein the second position of the physical queue is different from the service point, and wherein the first terminal is different from the second terminal.

10. The computing device of claim 9, wherein the queue syncing module is further configured to, in response to receiving an indication that the user is now at a position of a second physical queue, forward the activity to a third terminal associated with the position of the second physical queue.

11. The computing device of claim 10, further comprising:
a user detection module executing on the one or more processors and configured to track a mobile device associated with the user to determine that the user has left the physical queue and is now at the position of the second physical queue.

12. The computing device of claim 9, wherein the queue syncing module is further configured to forward the activity to a mobile device associated with the user in response to the user leaving the physical queue.

13. The computing device of claim 9, wherein the activities module is further configured to select the activity having a time to completion that is less than the estimated wait time.

14. The computing device of claim 9, wherein the activities module is further configured to select the activity that is related to the user's transaction at the service point.

15. The computing device of claim 9, wherein the queue syncing module is further configured to preserve state information of the activity at the first terminal associated with the first position, and to restore a state of the activity at the second terminal associated with the second position based on the preserved state information.

16. A non-transitory computer-readable storage medium comprising instructions for causing a programmable processor to:
estimate a wait time for a user located at a first position of a physical queue to reach a service point, wherein the user queues for the service point in the physical queue;
select an activity for the user at the first position of the physical queue based on the estimated wait time, the activity including an interactive software application;
send the selected activity to a first terminal at the first position of the physical queue; and
in response to receipt of an indication that the user has advanced to a second position of the physical queue that is closer to the service point than the first position, wherein the second position of the physical queue is different from the service point, forward the selected activity to a second terminal at the second position of the physical queue, wherein the first terminal is different from the second terminal.

17. The non-transitory computer-readable storage medium of claim 16, wherein the instructions cause the processor to:
in response to receipt of an indication that the user is now at a position of a second physical queue, forward the activity to a third terminal associated with the position of the second physical queue.

18. The non-transitory computer-readable storage medium of claim 16, wherein the instructions cause the processor to:
track a mobile device associated with the user to determine that the user has left the physical queue and is now at the position of the second physical queue.

19. The non-transitory computer-readable storage medium of claim 16, wherein the instructions cause the processor to:
forward the activity to a mobile device associated with the user in response to the user leaving the physical queue.

20. The non-transitory computer-readable storage medium of claim 16, wherein the instructions that cause the processor to select the activity further cause the processor to:
select the activity having a time to completion that is less than the estimated wait time.

21. The non-transitory computer-readable storage medium of claim 16, wherein the instructions that cause the processor to select the activity further cause the processor to:
select the activity that is related to the user's transaction at the service point.

22. The non-transitory computer-readable storage medium of claim 16, wherein the instructions that cause the processor to forward the activity further cause the processor to:
preserve state information of the activity at the first terminal associated with the first position; and
restore a state of the activity at the second terminal associated with the second position based on the preserved state information.

* * * * *